Feb. 11, 1947. L. W. STETTNER ET AL 2,415,660
VALVE
Filed June 7, 1944
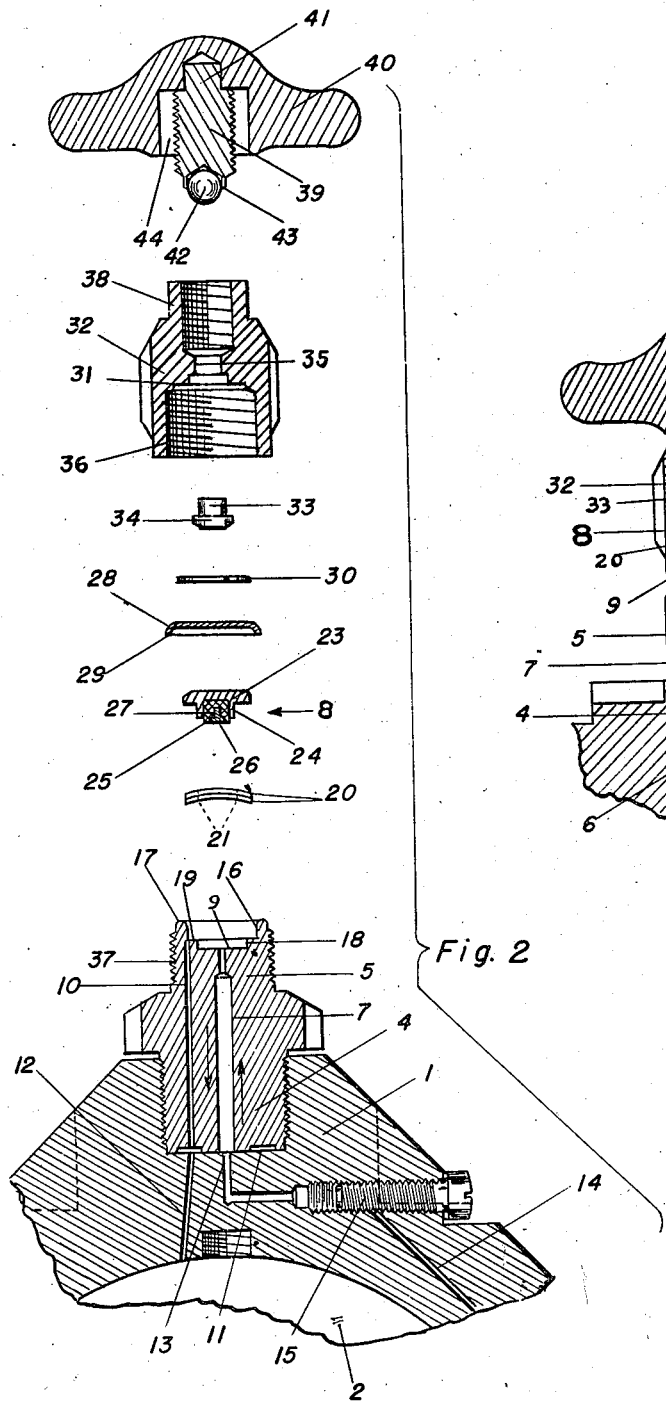
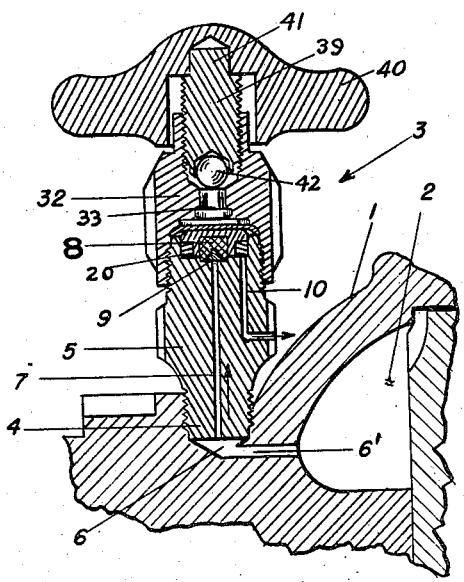
Fig. 1
Fig. 2
INVENTORS.
LUDWIG W. STETTNER
KARL F. HEINEMANN
By J. A. Bried
Attorney Patented Feb. 11, 1947

2,415,660

UNITED STATES PATENT OFFICE 2,415,660

VALVE

Ludwig W. Stettner, Piedmont, and Karl F. Heinemann, Oakland, Calif., assignors to Victor Equipment Company, San Francisco, Calif., a corporation of Delaware Application June 7, 1944, Serial No. 539,148

1 Claim. (Cl. 251—46)

This invention relates to valves, particularly such valves as are used in controlling high, air or gas pressures, in gas welding and cutting equipment, and the invention has for its principal object an improved pressure controlling valve for feeding and/or bleeding gas pressure from the dome space of automatic gas pressure regulators of the type shown in the Stettner Patent No. 2,248,592.

Special features and advantages of the improved construction will appear in the following description and accompanying drawing.

In the drawing,

Fig. 1 is a central longitudinal cross section showing the general construction of our improved valve as applied to a gas dome type automatic pressure regulator with the attaching nipple portion of the valve body screwed into the bonnet of the gas dome type of pressure regulator and with the nipple ported for bleeding off the pressure.

Fig. 2 is an enlarged central longitudinal sectional view showing all the pieces of the valve separated but aligned with the vertical center line of the valve and in their proper sequence, but with the final attaching nipple screwed into the bonnet of a gas dome type automatic pressure regulator and ported for feeding gas from a high pressure source to the dome space.

In the figures, the bonnet of the gas dome type of automatic pressure regulator is indicated at 1 and the dome gas space at 2, while at 3 generally is our improved valve with its attaching nipple 4 of the valve body 5 screwed into a threaded recess 6 in the dome wall 1 and which recess is ported at 6' to the gas space 2 so as to place the same in communication with the central very small gas inlet passage 7 of the valve 3 normally closed by the valve button 8, and which when opened or released from its seat 9 permits the gas under pressure in the dome space 2 to "bleed off" or escape to atmosphere through an exhaust port 10.

In Fig. 2, the attaching nipple 4, instead of being vented to atmosphere through its exhaust port has an exhaust port 10' drilled eccentrically of the central inlet passage 7 and which exhaust port extends straight through the body portion 5 and nipple portion 4 and opens at its lower end in an annular recess 11 formed in the lower end of the nipple and which recess is ported at 12 to the gas dome space 2 for introduction of gas to said space from the inlet passage 7 of the valve when the valve is open, the high pressure gas entering the central passage 7 from ports 13 and 14 from any suitable source of high pressure gas on the regulator not shown, and preferably through a suitable flow restrictor such as the slight thread clearance of a screw 15 indicated.

The upper end of the body is centrally recessed as at 16 and formed with a rounding upper edge 17, and at the bottom of the recess 16 is a smaller recess 18 at the center of which the inlet passage 7 opens, while the outlet port 10 or 10' opens into the larger chamber 16 at the shoulder 19 formed at the juncture of the two recesses.

The several parts of the valve 3 are shown separately spaced above the body part 5 of Fig. 2 and consist of the following items:

20 is a pair of very thin round washers made of spring steel and bent transversely as indicated so as to form a laminated arched spring. These washers fit freely within recess 16 and rest upon shoulder 19 and the central hole 21 is of a size to freely pass the neck of the valve button 8 shown above the spring washers.

Valve button 8 comprises a relatively thick disk-like head 23 with a depending tubular neck 24 within which is tightly pressed a resilient plug 25 as of semi-hard rubber, synthetic rubber, or other suitable valve composition, and in the center of the plug is a small metal insert 26 taking the form of a small disk of a size to close off the valve inlet passage 7, and to the rear side of the disk is a small stem 27 to stabilize it in place. It should be noted that both the resilient plug 25 and the outer face of the metal insert 26 are flush and project somewhat beyond the lower edge of neck 24 which is preferably made of metal and is integral with head 23.

The valve button assembly unit fits freely within the double recess 16, 18 as shown in Fig. 1.

28 is a small, preferably metal, circular flexible diaphragm which, when in place fits across the open upper end of the body 5 against the rounding edge 17 and is turned down at its margin as at 29 to embrace the rounding edge, and when in place the diaphragm lies against the top of button head 23 which is rounded at its edge to prevent injury to the diaphragm.

Above the diaphragm is a very thin flexible disk 30 preferably of tempered steel. This disk fits within a recess 31 formed in the bonnet 32 of the valve and rests upon the upper side of the diaphragm 28 while above the disk 30 is a small plunger 33 formed with a disk-like head, all being of the general form of a flat-head rivet, and which plunger fits slidably in a bore 35 in the bonnet 32 with its head 34 in contact with the disk 30.

The bonnet 32 is recessed and threaded at its lower end as at 36 to screw over the exteriorly threaded upper end 37 of the body 5, and the upper end of the bonnet is bored and threaded as at 38 to receive a screw 39 extending from the under side of a wing-nut 40. The upper end of the screw 39 is squared as at 41 and forced into a recess in the wing-nut or otherwise rigidly secured thereto, and the lower end of the screw is cupped and fitted with a steel ball 42 arranged to bear on the upper end of plunger 33 when the parts are assembled as shown in Fig. 1. The cupped socket for the ball extends at its margins somewhat over the center of the ball as indicated at 43 to hold the ball in place yet permit freedom for the ball to revolve.

The wing-nut 40 is preferably recessed as at 44 around the screw 39 so as to straddle the upper end of the bonnet 32 for compactness.

In operation, upon screwing down the wing-nut the ball forces down the plunger 33 the head of which is in contact with the hard metal disk 30 and the latter bears against the diaphragm transmitting the slight motion, or rather pressure, to the valve button 23 to seal off the inlet passage 7 with the metal insert 26 and at the same time compress spring releasing washers 20 and also compress the annular lower exposed margin of the resilient plug 25 against the valve seat (formed by the flat bottom of recess 18) in an annular contact entirely surrounding the metal valve insert 26.

The construction and functioning of the valve as described may seem conventional, but it is desired to point out that these valves are used with inlet pressures running to eight thousand pounds per square inch, and over, and it was not until a great deal of experimenting and many failures before the described assemblage was finally arrived at that the valve became a success, and we were able to produce an easily operated reliable valve for this purpose, and it is to this novel improved assemblage and its reasonable modifications that we feel entitled to patent protection.

We therefore claim:

A valve assemblage comprising a valve body member with a gas passage extending therethrough and terminating at a surface forming a valve seat, a valve button for the end of said passage provided with a recessed side facing the end of said passage, a plug of resilient material filling said recess, and a metal insert imbedded in said resilient material having an exposed face of a size to cover the end of said passage when said valve button is forced toward said seat, and means for forcing said valve button toward said seat, said resilient material projecting beyond said recess so as to yieldingly contact said seat annularly around said insert when the valve button is forced toward said seat, said valve button provided with an enlarged disk-like head guided in a recess formed in said body, and an annular sheet metal spring surrounding said button reacting between the bottom of the body recess and said head tending to hold said valve button unseated, a flexible disk diaphragm covering the body recess in contact with the outer surface of the head of the valve button, and a bonnet member screwed to the body clamping the diaphragm against the edge of the body recess, a thin hard disk positioned upon the outer side of said diaphragm, and a reciprocable plunger slidably supported in said bonnet in contact at one end with said disk, a hand screw screwed into the outer end of said bonnet provided with a single ball bearing ball at its inner end in contact with said plunger.

LUDWIG W. STETTNER.
KARL F. HEINEMANN.

REFERENCES CITED

The following references are of record in the file of this patent:

UNITED STATES PATENTS

| Number | Name | Date |
|---|---|---|
| 2,302,029 | Hulsmann | Nov. 17, 1942 |
| 1,485,792 | McKay | Mar. 4, 1924 |
| 1,656,375 | Harris | Jan. 17, 1928 |
| 2,297,944 | Collins | Oct. 6, 1942 |
| 2,124,155 | Thaete | July 19, 1938 |
| 2,279,519 | Paquin | Apr. 14, 1942 |